United States Patent Office.

JOHN BABCOCK, OF CAMBRIDGEPORT, MASSACHUSETTS.

Letters Patent No. 99,618, dated February 8, 1870.

IMPROVED COMPOSITION FOR PREPARING WOOD FOR PAINTING.

The Schedule referred to in these Letters Patent and making part of the same.

To all whom it may concern:

Be it known that I, JOHN BABCOCK, of Cambridgeport, in the county of Middlesex, and State of Massachusetts, have invented an Improved Composition or "Filling" for Preparing the Surface of Wood and Metal for Painting and Varnishing; and I hereby declare that the following is a full, clear, and exact description of the same.

My invention consists in an improved composition or "filling" for preparing the bodies of carriages, railroad-cars, and other surfaces of wood or metal, for painting and varnishing, by the use of which composition, I am enabled to make a great reduction in the time formerly required for this operation, and also effect a large saving in paint and labor.

To enable others skilled in the art to understand and use my invention, I will proceed to describe the manner in which I have carried it out.

My improved composition is prepared in the following manner:

One gallon of linseed-oil, one-half pound of gum-shellac, and one-half pound of "candle-pitch," the residuum from the distillation of palm-oil for candles, are mixed together and boiled. After becoming partially cooled, one quart of spirits of turpentine is added, and the whole stirred, until the several ingredients are thoroughly incorporated together, when it is ready for use.

I do not confine myself to the exact proportions above stated, as they may be varied according to circumstances, without departing from the spirit of my invention; those first mentioned, however, I have found to answer well.

The surface of the wood to be painted is first smoothed with sand-paper, or other suitable material. A thin coat of my improved composition is then laid on and rubbed into the wood, so as to penetrate it, and fill the "grain," after which, it is allowed to dry, when the wood is rubbed down with pumice-stone, &c., until it presents a smooth and even surface. The composition is then applied a second time, and when dry, rubbed down as before, when the surface thus prepared will be ready to receive the finishing-colors and varnishes, which are to be applied in the ordinary manner.

The above-described composition penetrates and fills the grain of the wood, and renders its surface smooth, elastic, and capable of receiving a superior finish, while it materially lessens the liability of the paint and varnish becoming cracked on exposure to the weather, thus rendering the work much more durable than where the surface of the wood is first covered with several thick coatings of lead-colors or other paints, as has heretofore been customary.

Another great advantage over the employment of lead-colors, &c., is, that the time required for the operation of painting is greatly reduced; and by dispensing with the lead-colors, a great saving of paint is effected, as well as of the labor required in applying and rubbing down the same.

My improved composition may be applied to advantage in preparing metallic surfaces for painting and varnishing, as well as those of wood.

Claim.

What I claim as my invention, and desire to secure by Letters Patent, is—

The within-described composition, made of the ingredients set forth, and mixed together, substantially as and for the purpose specified.

JOHN BABCOCK.

Witnesses:
P. E. TESCHEMACHER,
N. W. STEARNS.